United States Patent

Malsky

[15] 3,694,080
[45] Sept. 26, 1972

[54] METHOD OF AND APPARATUS FOR PHOTOPRINTING CONDUCTOR PATTERNS ON THE CURVED SURFACES OF TRANSDUCERS

[72] Inventor: Herbert Malsky, Belmont, Mass.

[73] Assignee: Massachusetts Institute of Technology, Cambridge, Mass.

[22] Filed: March 9, 1970

[21] Appl. No.: 17,691

[52] U.S. Cl. .....................355/86, 355/47, 355/53, 355/85, 355/104, 310/DIG. 6
[51] Int. Cl..............................................G03b 27/00
[58] Field of Search........355/53, 47, 18, 74, 104, 85, 355/86; 310/DIG. 6

[56] References Cited

UNITED STATES PATENTS

| | | | |
|---|---|---|---|
| 3,155,025 | 11/1964 | Kallenberg | 355/104 |
| 3,214,309 | 10/1965 | Dileo et al. | 315/86 |
| 2,760,127 | 8/1956 | Duncan et al. | 310/DIG. 6 |
| 844,162 | 2/1907 | Mertens | 355/86 |
| 1,011,199 | 12/1911 | Huebner | 355/85 |
| 1,838,312 | 12/1931 | Kanolt | 355/133 |
| 3,077,824 | 2/1963 | Hutchins | 355/86 |

Primary Examiner—Samuel S. Matthews
Assistant Examiner—Russell E. Adams
Attorney—Thomas Cooch, Arthur A. Smith, Jr. and Martin M. Santa

[57] ABSTRACT

Method of and apparatus for positioning and photoprinting with high accuracy a magnetic or electrically conducting pattern of repeatable units on the curved surfaces of revolution of a transducer. The curved surface is placed on an indexing mount, and a mask of one unit of the pattern and conforming to the curved surface is located as close as possible to, but not in contact with the curved surface. Light is directed through the mask, projecting the image of the unit on the photoresist-coated surface. The surface is then rotated relative to the mask through an angular displacement corresponding to the desired distance between units of the pattern. The light again impinges through the mask, and another unit is exposed. The process is continued until a full revolution is achieved, and a complete pattern of repeatable units is formed. Where the mask is mounted on an indexing mount, the process is as aforementioned, except that the mask is rotated relative to the mount.

7 Claims, 5 Drawing Figures

INVENTOR:
HERBERT MALSKY
BY *Arthur A. Smith, Jr.*
ATTORNEY

METHOD OF AND APPARATUS FOR PHOTOPRINTING CONDUCTOR PATTERNS ON THE CURVED SURFACES OF TRANSDUCERS

The invention described herein was made in the performance of work under a National Aeronautics and Space Administration contract and is subject to the provisions of Section 305 of the National Aeronautics and Space Act of 1958, Public Law 85-568 (72 Stat. 435, 42 U.S.C. 2457).

BACKGROUND OF THE INVENTION

1. Field of the Invention

This invention relates generally to photoprinting techniques and particularly to a method of and apparatus for photoprinting magnetic and electrically conducting patterns on the curved surfaces of transducers.

2. Description of the Prior Art

Transducers or resolvers are known in the art as devices which convert the angular position of a rotating shaft relative to a reference into an output electrical signal. Such devices consist of a rotor and a stator, on the surface of either or both of which is etched a printed conductor pattern. The pattern, which may assume any of a variety of configurations, essentially comprises a series of repeatable units, each unit, in turn, comprising one or more interconnected conductor lines. Where the device is electromagnetic in nature, one common approach is to introduce a current into either the stator or rotor element, thereby inducing a potential in the other element, the amplitude of the induced potential being determined by the relative position of the rotor and stator. Hence, the variable induced voltage is a measure of the transduced angle.

Conventionally, to photoprint a conducting pattern of repeatable units on a rotor or stator element, a master pattern including all units is fabricated. Usually, the pattern is inscribed on an opaque coated glass plate. A photographic negative is then made and is used to expose the pattern onto the transducer surface by means of contact printing. Finally, the pattern is developed and etched. When applied to curved surfaces rather than discs, the negative of the pattern of repeatable units is wrapped around the curved surface making intimate contact with it, whereupon it is then exposed. The curved surface itself is typically composed of either a copper-plated dielectric or a copper-clad plastic strip cemented to its surface. Photoresist is coated on the copper. An alternate technique for curved surfaces is to expose, develop and etch the pattern of repeatable units on a thin, flat, flexible strip of copper-clad plastic laminate. The strip is then wrapped around and cemented to the curved surface.

When any of the aforementioned conventional art methods of fabricating printed patterns is employed in making resolvers having a curved surface of revolution, e.g., where the rotor/stator elements are shaped as cylinders, cones or spheres, relatively poor accuracy results. If a negative is wrapped around, say, a cylinder and exposed on its surface, significant errors are introduced by the diametrical tolerance error of the copper surface and the stretch of the wrap around the mask. Alternatively, if a thin, flat strip of copper-clad plastic laminate containing the printed pattern is cemented on the cylindrical or otherwise curved surface, poor accuracy results due to the inherent lack of precision, their linear spacing on the flat strip must correspond to the design radius of curvature of the pattern. Such correspondence is inherently difficult to attain with the accuracy required of such precision instruments. Errors are also introduced by variation in the thickness of the strip or of the cement, by stretching of the strip after it has been cemented to the curved surface, and by the diametrical tolerance error of the curved surface to which the strip is cemented.

SUMMARY OF THE INVENTION

In view of the foregoing limitations of photoprinting of conducting patterns on the curved surfaces of transducers, it is a general object of the invention to provide a method of and apparatus for positioning and photoprinting a predetermined pattern of repeatable units on any curved surface of revolution with a high degree of angular accuracy and unit uniformity.

It is another object of the invention to provide a method of and apparatus for positioning and photoprinting conducting patterns of repeatable units on a curved surface of revolution with minimum diametrical tolerance errors.

These and other objects are met by photoprinting the pattern directly on the transducer's curved surfaces such that the mask conforms to the curved surface, obviating the need for a negative or laminated strip.

The curved surface or workpiece to which the process relates may be either on the stator or rotor and may be either the inner or outer surface. For clarity, the preferred embodiment of the invention is described in terms of its applicability to a typical rotor wherein it is desired to photoprint on the rotor's exterior surface. It is understood that the process applies with equal validity where the workpiece is a stator surface and/or where the surface is an interior diameter.

The rotor workpiece generally used with the preferred embodiment is a cylinder comprising a metallic base, such as beryllium, coated with a non-conductive material, such as epoxy, over which is coated a film conductor, such as copper.

The rotor's film conductive surface is coated with a photoresist substance. The rotor is then positioned on a precisely calibrated indexing mount; a mask of one unit of the desired pattern, conforming in shape to that of the curved surface, is located in proximity to the curved surface; and light, preferably collimated, is directed through the mask onto the curved surface for a set period of time corresponding to the type of photoresist material. The curved surface is then rotated relative to the mask through an angular displacement corresponding to the predetermined pattern, and the light is again directed through the mask onto the surface. The aforementioned process is repeated for a full revolution. The pattern is then developed and etched on the surface. In the preferred embodiment a movable window or secondary mask is used in conjunction with the primary mask so as to facilitate the electrical interconnection of the units comprising the pattern.

The aforementioned process and apparatus allow the printed units to be located on the curved surface to within the accuracy of the mechanical apparatus by which the rotation between the curved surface and the mask is accomplished. The resultant accuracy is at least an order of magnitude better than that achieved by prior art techniques. Further, since the units are printed from the same mask they are inherently identical and thus yield a high degree of uniformity. By conforming the mask to the shape of the surface and by positioning it in proximity to the surface, the aforementioned distortion which normally arises from projecting a flat pattern through an optical system onto a curved surface is substantially eliminated.

Further objects, features and advantages of the present invention, and a better understanding thereof will become apparent from the following detailed description taken in conjunction with the accompanying drawings.

DRAWINGS

PREFERRED EMBODIMENT

Preparatory to the photoprinting, the terminal enabling the contact between the pattern and voltage source is made as follows. A terminal pin is inserted into an aperture through the rotor's base and non-conductive layer, the base end of the pin coupling to a voltage source. The pin is secured in place with an insulating cement. That end of the pin intended for contact with the pattern is then ground flush with the surface of the non-conductive layer, and the entire surface is then plated with the conducting film. Consequently, plating completes the contact. After the conductive pattern has been formed as described below, nothing further is required to complete the contact.

Figure 1:
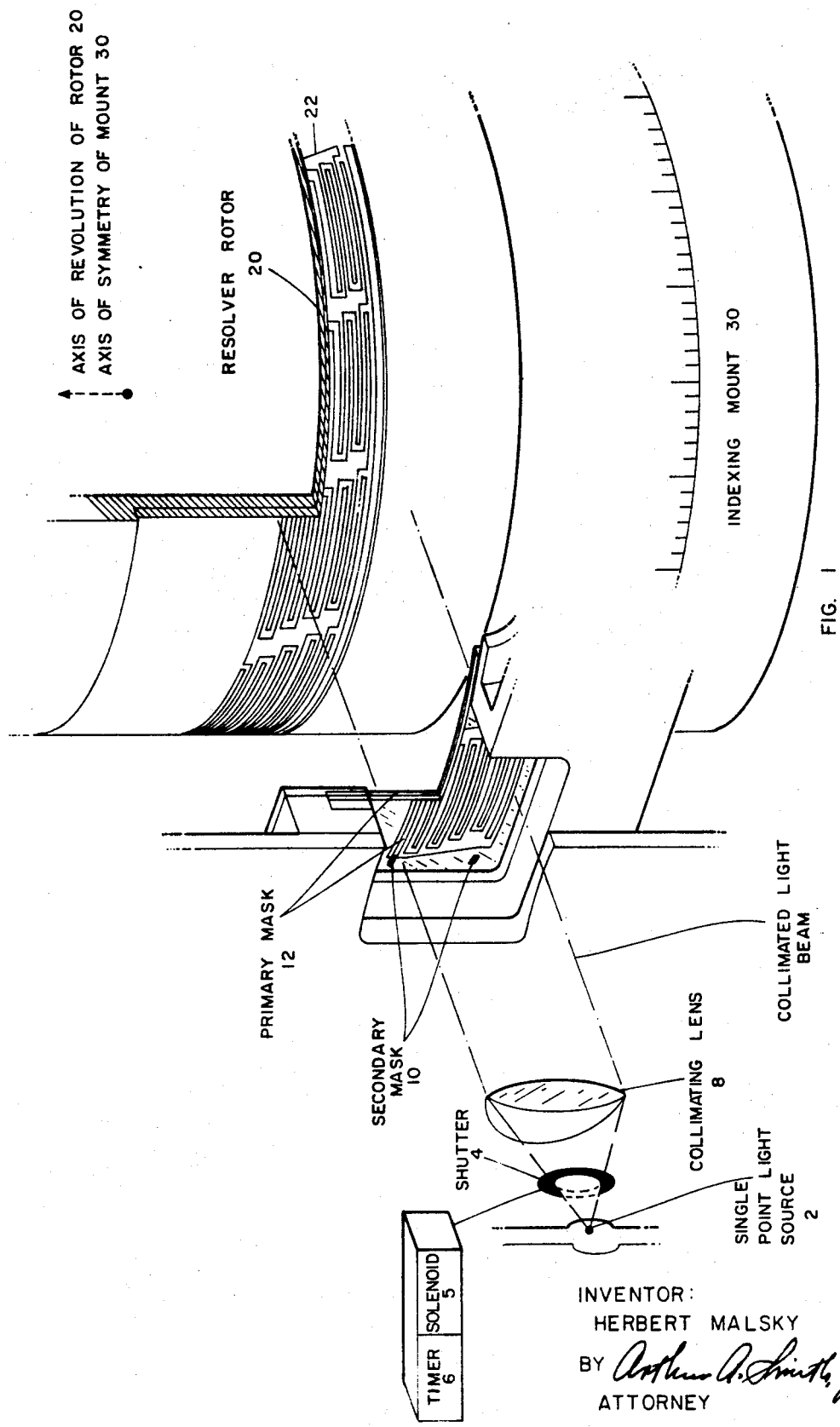
FIG. 1 shows the apparatus used in the preferred embodiment to photoprint a pattern on the exterior of a curved surface of revolution of a rotor.

As noted in FIG. 1, rotor 20, having exterior curved surface 22, is positioned on indexing mount 30. Mount 30, constituting a precisely calibrated index, is circular in shape and is mounted relative to rotor 20 such that its axis of symmetry is coincident with the axis of revolution of the rotor. Mount 30 is rotatable about its axis of symmetry to discrete positions corresponding to the desired spacing between units of the printed pattern. (The type of indexing mount used in the preferred embodiment is typically accurate to a quarter arc second.)

As further shown in FIG. 1, light is generated by single point light source 2 at the focal point of collimating lens 8, thereby producing a collimated light beam. The light beam, in turn, is directed through secondary mask 10 and thence through primary mask 12, impinging upon rotor surface 22 which has been coated with a positive photoresist substance. In the preferred embodiment, exposure time is controlled by positioning air cylinder operated shutter 4 between light source 2 and lens 8. The shutter, in turn, is coupled to solenoid 5 which is operated by timer 6. The exposure time depends on a number of factors such as the type and thickness of the photoresist, the intensity of the light source and the like. A typical exposure time is in the order of 15 seconds.

After exposure of surface 22 in one position, indexing mount 30 is rotated to the next position, and another unit of the pattern is exposed. This process continues until surface 22 has been rotated through a full revolution, thereby forming a complete pattern or array.

Figure 2:
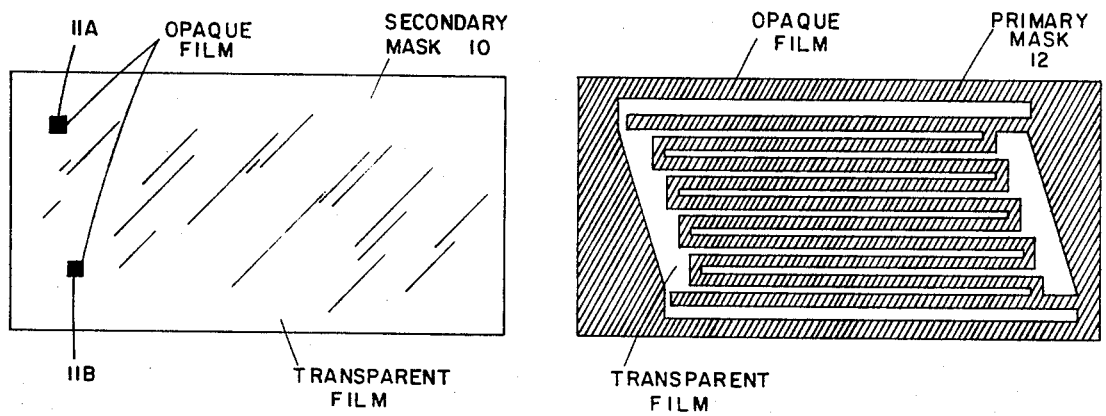
FIG. 2 shows a close-up view of a typical primary mask and secondary mask used in the preferred embodiment of the invention.

As shown in FIGS. 1 and 2, primary mask 12 is shaped to conform to the curvature of surface 22 and, in the preferred embodiment, is stationary while surface 22 is rotated relative to it. The mask is a photographic film produced by conventional art work or through photography. (However, it may also comprise appropriately shaped and coated quartz or glass.) The shape of the repeatable unit to be exposed is outlined on the surface of mask 12 by the appropriate combination of opaque and transparent sections on the film. For example, in the preferred embodiment, light passes through the transparent sections of the film, exposing the photoresist material on surface 22 in its line of sight. Simultaneously, light is blocked by the opaque sections of the film. After developing, the exposed sections of photoresist are removed baring the copper underneath. The copper, in the exposed areas is then etched away, leaving the remaining copper on surface 22 to form the conducting path comprising the unit of the pattern. Where the photoresistive coating on the surface to be photoprinted is negative, the transparent areas of the mask correspond to the unit's conducting path. In any event, subject invention comprehends either of the aforementioned.

Figure 2A:
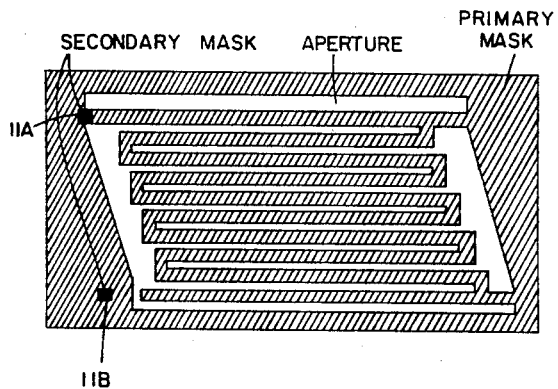
FIG. 2A shows one of two possible positions of the secondary mask relative to the primary mask in the preferred embodiment.
Figure 2B:
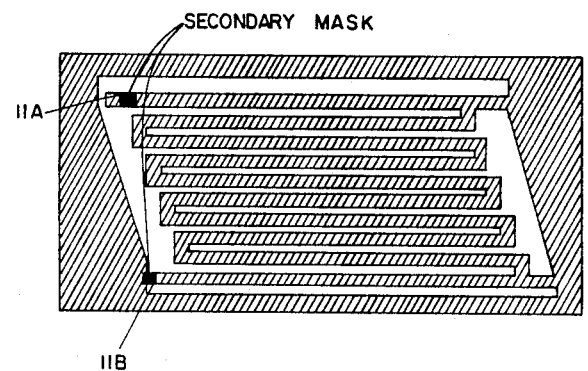
FIG. 2B shows the second of two possible positions of the secondary mask relative to the primary mask in the preferred embodiment.

As further shown in FIGS. 1 and 2, secondary mask 10 is likewise a film and has an appropriate combination of opaque and transparent sections for the passage and blockage of light. (Here again, it may also comprise appropriately shaped and coated quartz or glass.) The secondary mask is movable relative to primary mask 12 and, in the preferred embodiment, is capable of assuming two positions relative to the primary mask as shown in FIGS. 2A and 2B. As noted in the figures, secondary mask 10 comprises a transparent film having two opaque sectors 11A and 11B which block entry of light. It is apparent that the shape of the secondary mask depends on the shape of the unit pattern on the primary mask and the desired blockage of light.

Figure 2C:
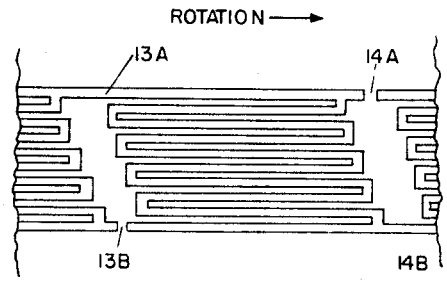
FIG. 2C shows a portion of the pattern resulting from the combined use of the primary and secondary masks according to the preferred embodiment of the invention.

An illustrative segment of the pattern produced by the relative positioning of the primary and secondary masks is shown in FIG. 2C. As noted therein, a conduction path between units of the pattern is formed at connection points 13A and 14B, while the path is broken at points 13B and 14A. Referring now to FIG. 2A, in conjunction with FIG. 2C, with movable mask 10 in its first position, opaque sector 11A blocks light from entering through the transparent portion of primary mask 12 at connection point 13A, thereby ensuring the aforementioned conduction path at that point. Opaque sector 11B, on the other hand, does not block light at point 13B; hence, the conduction path is broken at that point. Likewise, with movable mask 10 in its second position, as shown in FIG. 2B, opaque sector 11A does not block point 14A; but opaque sector 11B does block point 14B, causing the breaking and forming of the conduction path, respectively, shown in FIG. 2C.

According to the process, as rotor surface 22 is displaced to each successive location via rotation of indexing mount 30, as aforementioned, secondary mask 10 alternates between its first and second positions so as to produce the desired conduction path. (When another type of pattern configuration is employed, it may be preferable to maintain the secondary mask in its first position through a full revolution and then in its second position for the next revolution, rather than alternating. This, of course, depends on the pattern itself.)

The apparatus used to photoprint the inside surface of a cylinder or other curved surface such as the interior of rotor 22 is identical to that shown in FIG. 1, except for the addition of mirrors to direct the collimated light beam where necessary.

It is apparent that various modifications may be made to the described preferred embodiment and yet remain within the intended scope of the invention.

For instance, it may prove advantageous to mount the primary mask on the indexing mount and rotate the primary mask relative to a stationary rotor. Further, as explained, the secondary mask is needed only where the particular pattern configuration requires, as in the preferred embodiment, the development of a conducting path between the repeatable units of the overall pattern. In this respect, it is obvious that the shape of both the primary and secondary mask may be changed to conform to the shape of the particular pattern and still remain within the scope of the invention. Likewise, the invention is not limited to the pattern described herein or to any particular pattern configuration. To cover the above and other departures that may be made and yet remain within the spirit and scope of the invention, the invention is now defined in the appended claims.

What is claimed is:

1. Apparatus for positioning and photoprinting a predetermined conducting pattern of repeatable and identically configured units on the curved surface of revolution of a transducer, said surface being coated with a film conductor which, in turn, is coated with photoresist material, said apparatus comprising in combination:
   a. a primary mask of one of said units conforming in shape to that of said curved surface;
   b. means for mounting said curved surface of said transducer;
   c. means for mounting said primary mask as close as possible to, but not in contact with, said curved surface;
   d. a source of light;
   e. means for directing said light through said primary mask onto said curved surface for a predetermined period of time, thereby exposing said unit onto said surface;
   f. means for rotating said primary mask and said curved surface relative to each other through an angular displacement corresponding to said predetermined pattern of repeatable units.

2. The apparatus of claim 1 wherein said means for mounting said primary mask is a stationary frame and said means for mounting said curved surface is a rotatable indexing mount having an axis of symmetry coincident with the axis of revolution of said transducer, and further wherein said curved surface is rotated relative to said stationary frame.

3. The apparatus of claim 1 wherein said means for mounting said curved surface is a stationary frame and said means for mounting said primary mask is a rotatable indexing mount, and further wherein said primary mask is rotated relative to said stationary frame.

4. The apparatus of claim 1 further including a secondary mask positioned between said light source and said primary mask and moveable relative to said primary mask for printing connections between said repeatable units.

5. Apparatus for positioning and photoprinting a predetermined conducting pattern of repeatable and identically configured units on the curved surface of revolution of a transducer, said surface being coated with a film conductor which, in turn, is coated with photoresist material, said apparatus comprising in combination:
   a. a primary mask of one of said units conforming in shape to that of said curved surface;
   b. a stationary frame for mounting said primary mask as close as possible to, but not in contact with, said curved surface of said transducer;
   c. a precisely calibrated and circular indexing mount for mounting said curved surface, said mount being rotatable;
   d. means for mounting said curved surface on said indexing mount such that the axis of symmetry of said indexing mount coincides with the axis of revolution of said transducer;
   e. a source of light;
   f. a secondary mask positioned between said light source and said primary mask, said secondary mask moveable relative to said primary mask such as to prevent the passage of said light through a predetermined section of said primary mask;
   g. a collimating lens for collimating said light source and for directing said light through said secondary mask and said primary mask onto said curved surface, thereby exposing said repeatable unit onto said surface;
   h. means for controlling said exposure time for a predetermined time period;
   i. means for rotating said indexing mount relative to said primary mask through an angular displacement corresponding to said predetermined pattern of repeatable units.

6. A method of positioning and photoprinting a predetermined conducting pattern of repeatable units on the curved surface of revolution of a transducer, said surface being coated with a film conductor which, in turn, is coated with photoresist material, said method comprising the steps of:
   a. mounting a primary mask in proximity to, but not in contact with, said curved surface, said primary mask conforming in shape to the shape of said curved surface;
   b. directing light through said curved surface for a predetermined period of time, thereby exposing a unit onto said surface;

c. rotating said curved surface and said primary mask relative to each other through an angular displacement corresponding to the predetermined pattern;
d. repeating said exposing and said rotating through a full revolution, thereby forming a complete pattern of repeatable units; and
e. developing and etching the pattern on said curved surface.

7. The method of claim 6 comprising the further steps of mounting a secondary mask between the source of said light and said primary mask and moving said secondary mask relative to said primary mask such as to prevent the passage of said light through a predetermined section of said primary mask, thereby printing connections between said repeatable units.

* * * * *